US008169969B2

(12) United States Patent
Vedantham et al.

(10) Patent No.: US 8,169,969 B2
(45) Date of Patent: May 1, 2012

(54) RADIO BEARER DEPENDENT FORWARDING FOR HANDOVER

(75) Inventors: Ramanuja Vedantham, Dallas, TX (US); Sandeep Bhadra, Dallas, TX (US); Shantanu Kangude, Dallas, TX (US); Seung Baek, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 957 days.

(21) Appl. No.: 12/141,439

(22) Filed: Jun. 18, 2008

(65) Prior Publication Data

US 2009/0042573 A1 Feb. 12, 2009

Related U.S. Application Data

(60) Provisional application No. 60/944,914, filed on Jun. 19, 2007.

(51) Int. Cl.
*H04W 4/00* (2009.01)

(52) U.S. Cl. ........................................ 370/331; 455/436

(58) Field of Classification Search ................. 370/331; 455/436
See application file for complete search history.

(56) References Cited

U.S. PATENT DOCUMENTS

| 6,947,399 B1* | 9/2005 | Sen et al. ........................ 370/331 |
| 2006/0168504 A1* | 7/2006 | Meyer et al. ................... 714/799 |
| 2007/0153742 A1* | 7/2007 | Sebire et al. ................... 370/331 |

* cited by examiner

*Primary Examiner* — Jeffrey Pwu
*Assistant Examiner* — Farhad Ali
(74) *Attorney, Agent, or Firm* — Robert D. Marshall, Jr.; Wade James Brady, III; Frederick J. Telecky, Jr.

(57) ABSTRACT

This invention employs an inherent tradeoff in a radio bearer dependent data handling method for intra-E-UTRA handoffs. For user equipment using real time data, the source node forwards to the target node not yet acknowledged real time service data units and disconnects. This makes the handoff latency short at the expense of data traffic between nodes. For user equipment not needing real time data, the source node continues to receive user equipment acknowledgements during a time out period and only forwards service data units acknowledged during the time out period. This reduces X2 interface traffic between the source and target nodes but extends the handoff latency.

7 Claims, 3 Drawing Sheets

US 8,169,969 B2

RADIO BEARER DEPENDENT FORWARDING FOR HANDOVER

CLAIM OF PRIORITY

This application claims priority under 35 U.S.C. 119(e)(1) to U.S. Provisional Application No. 60/944,914 filed Jun. 19, 2007.

TECHNICAL FIELD OF THE INVENTION

The technical field of this invention is wireless communication.

BACKGROUND OF THE INVENTION

An emerging wireless communication standard Evolved Universal Terrestrial Radio Access Network (E-UTRAN) has determined that during handover (HO) of user equipment (UE) from one base station (E-UTRAN node B or eNB) to another, the source eNB forwards all packet data convergence protocol (PDCP) service data units (SDU) corresponding to the unacknowledged radio link control (RLC) protocol data units (PDU). It has not yet been determined whether the final RLC status report is forwarded to the source eNB or the target eNB. The number and characteristics of the packets forwarded on the X2 interface depends on this. The choice of RLC status report forwarding between source and target eNB also has impact on the overall HO process, especially the break latency from the source eNB and the HO command reliability. Comparing performance of some proposals on HO data handling, different proposals optimize one aspect such as latency at the expense of another aspect such as overhead.

SUMMARY OF THE INVENTION

This invention employs an inherent tradeoff in a radio bearer dependent data handling method for intra-E-UTRA HOs. This invention optimizes the handoff based on the quality of service (QoS) requirements of the currently existing flows (radio bearers) at the UE. For user equipment using real time data, the source node forwards to the target node all real time service data units not yet acknowledged by the user equipment and disconnects. This makes the handoff latency short at the expense of data traffic between nodes. For user equipment not needing real time data, such as transmission control protocol data, the source node continues to receive user equipment acknowledgements during a time out period. Following this time out period, the source node forwards all service data units not yet acknowledged by the user equipment and disconnects. This reduces X2 interface traffic between the source and target nodes by eliminating the forwarding of service data units acknowledged by the user equipment during the time out period. This reduction in X2 interface traffic between the source and target nodes comes at the expense of extended the handoff latency.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
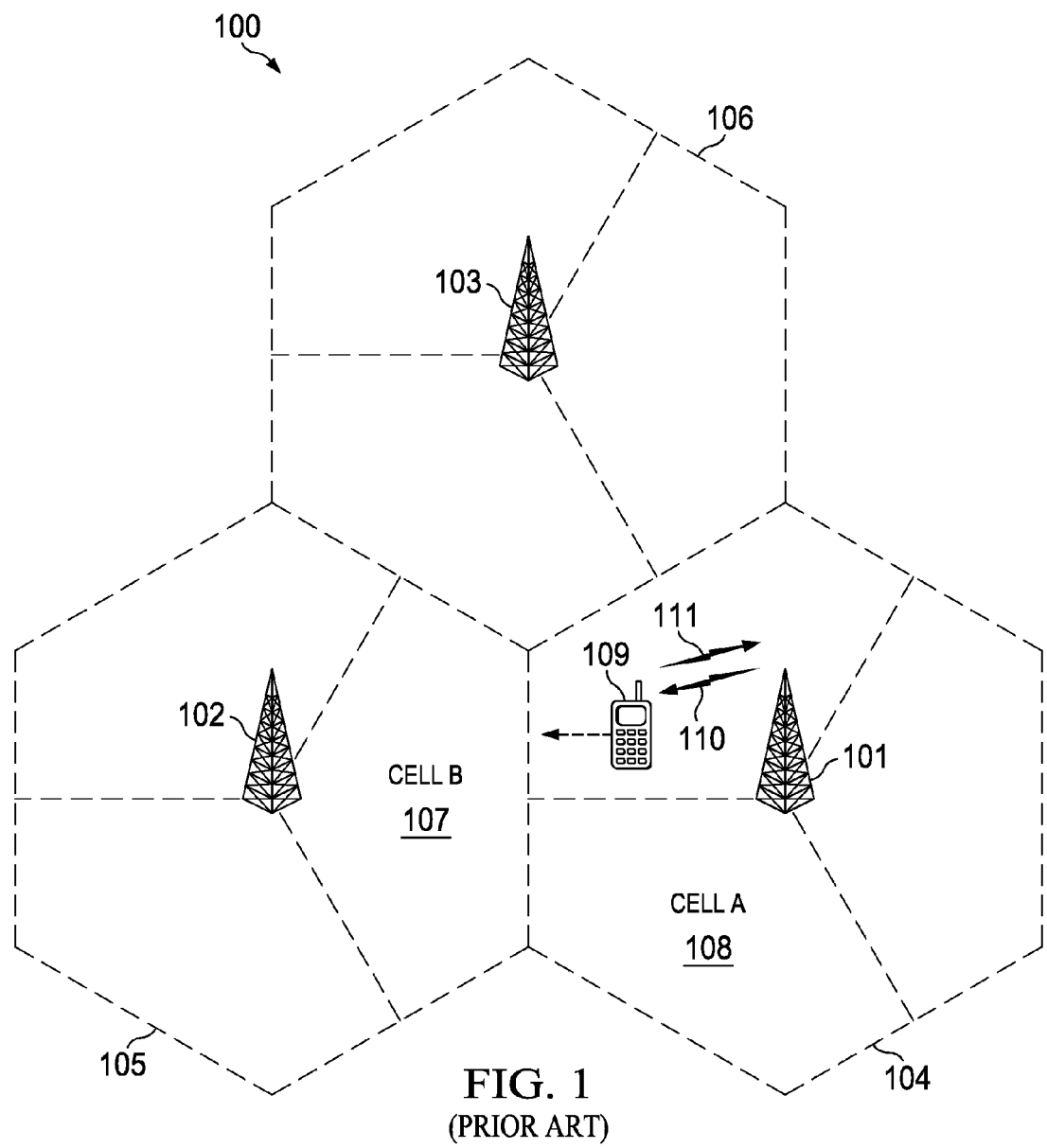
FIG. 1 is a diagram of a communication system of the having three cells of the type to which the present invention is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of uplink 111 time or frequency or code resources. If UE 109 has data ready for transmission, which may be traffic data, measurements report, tracking area update, UE 109 can transmit a random access signal on uplink 111. The random access signal notifies base station 101 that UE 109 requires uplink resources to transmit the UE's data. Base station 101 responds by transmitting to UE 109 via downlink 110, a message containing the parameters of the resources allocated for UE 109 uplink transmission along with a possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval.

RLC acknowledge signals (ACK) and not-acknowledge signals (NACK) are usually bunched together into one RLC status report. This is sent periodically and not after every RLC packet reception. This saves channel overhead while the automatic repeat request (ARQ) window allows the transmitter to continue transmitting. During HO, RLC states are reset and all PDCP SDUs corresponding to unacknowledged RLC PDUs are forwarded to the target eNB. Because of periodic nature of RLC status reports, some successfully received RLC PDUs may not be ACKed yet upon receipt of a HO command. The HO command is a break command after which no useful data is transmitted between the source eNB and the UE. The UE has the choice to either send the downlink (DL) RLC status report to the source eNB and then move to the target eNB, or move to the target eNB and then send the RLC status report to the target eNB. The two mechanisms have different ramifications.

In a first prior art alternative the UE sends the RLC status report to the source eNB. Upon receipt of the HO command, the UE sends the final DL RLC status report to the source eNB and then moves to the target eNB. Thus a UL message is sent after the HO command. This message can also carry the HO command ACK. The current technical specification does not proscribe the time when forwarding at the interface can start. Never attempted RLC PDUs and the corresponding PDCP SDUs can be forwarded upon HO command. The PDCP SDUs corresponding to the RLC PDUs that have been attempted and waiting RLC status report may not be forwarded until the RLC status report is received.

Figure 2:
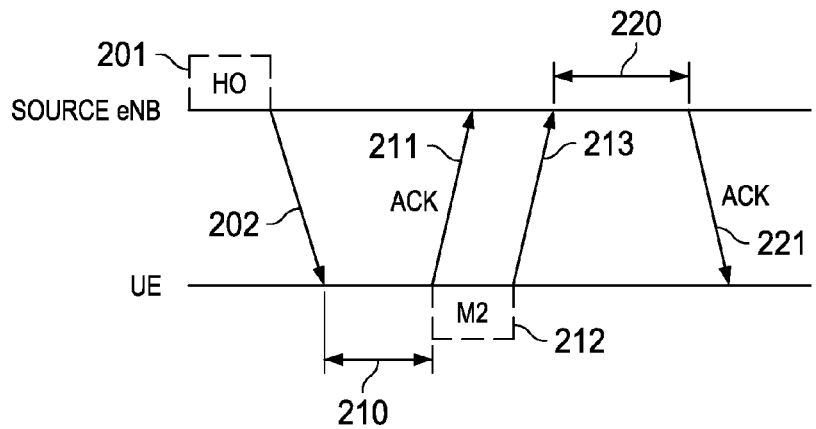
FIG. 2 illustrates the communications flow in a first prior art method.

FIG. 2 illustrates this communications process. The source eNB decides to issue a HO command 201 transmitted to the UE via transmission 202. As shown in FIG. 2, this process adds some latency in the break process. After the source node sends the HO Command 202, the eNB waits for the Layer 3 HO ACK 211 following a delay of 210 and the DL RLC Status report 213 following the processing of the hybrid automatic repeat request (HARQ) and uplink (UL) allocation 212 from the UE. Once the source eNB knows which of the PDCP SDUs have reached the UE correctly in the DL following delay 220, the source eNB sends an ACK signal 221 and forwards the remaining SDUs to the target eNB over the X2 Interface.

This method has several advantages. This method requires only a small overhead on X2 interface. Only a small fraction of packets will fail the HARQ process, thus the number of downlink SDUs that have not been received by the UE is small. Transporting these few SDUs across the X2 interface requires little overhead. This method is reliable because HO Command ACK provides greater reliability to the HO Process. This method reduces latency on target eNB. Because RLC Status reports do not need to be sent to the target eNB, latency on target eNB is reduced.

This method has a major disadvantage. The method increases the break latency at source eNB. The UE must wait to receive the HARQ ACK for the RLC status report before it can move to the target eNB. While the RLC status report may be transmitted around the same time as the HARQ ACK for the HO command is being transmitted, the additional delay occurs from waiting for the HARQ ACK for the RLC status report. This adds latency of the order of 4.5 ms on an average assuming 30% HARQ retransmissions. This added latency is more in the worse cases. Every unsuccessful HARQ transmission adds a delay of 5 ms. Assuming 3 ms for correct reception and 5 ms for HARQ round trip time for retransmissions, the break latency is 8 ms for one retransmission for the RLC status report and 13 ms for two retransmissions. This additional latency from the RLC status reporting may be significant for time-sensitive radio bearers. Note that new data that has never been transmitted over the air and for which no RLC status is outstanding can be forward over the X2 interface upon issue of the HO command.

In the second alternative, after the HO is complete the UE sends the last RLC status report meant for the source eNB to the target eNB. The source eNB begins forwarding all the outstanding unacknowledged RLC data as soon as it issues the HO command. These are forwarded over the X2 interface including some packets that were already received by the UE. The target eNB on receiving the RLC status report from UE, only selectively forwards on air those packets that were not successfully received by the UE. This reduces the latency described above and ensures that DL data is not repeated on air at the target eNB. However, this requires that the entire set of PDCP SDUs corresponding to window of unacknowledged RLC PDUs at the source eNB be transferred in a short time of about 20 ms between the source eNB and the target eNB. This occurs because in this time, the UE may connect to the target eNB and may then simply wait for the window of unacknowledged PDUs to arrive at the target eNB. If the target eNB wants to begin transmission without repeating the packets that have already been received by the UE, it must wait for packets on the X2 interface that have not been received by the UE. The entire unacknowledged RLC window of packets from the source eNB must reach the target eNB in a short time on the order of 20 ms to prevent unnecessary latency and channel overhead.

This method has the advantage of reduced HO break latency. The UE can move to the target eNB as soon as it sends the HARQ ACK to the source eNB after the HO command. This method has the disadvantage of high overhead on X2 interface. The peak data rate requirement on the X2 interface can be as high as five times the average data rate for forwarding packets involved in HO.

This second method is good in terms of latency for interactive real time radio bearers, but is expensive in X2 interface overhead for forwarding packets in bulk data transfer type of radio bearers. It follows that transmitting RLC status reports to the source eNB is good for transmission control protocol (TCP) and video by reducing overhead on X2 interface and improving reliability. Transmitting RLC status reports to the target eNB is good for delay-sensitive radio bearers such as voice and multi-user gaming with high interaction. Some classes of real time traffic may not use RLC. Thus waiting for the RLC status report provides no benefits.

The HARQ reliability for HO process can be improved to $10^{-5}$ by ensuring that the HO command from the source eNB to the UE is sent over a low modulation and coding scheme (MCS) signal on the DL synchronization channel (SCH) such as rate 1/6 quadrature phase shift keying (QPSK). This low rate implies that the size of the HO command which typically contains broadcast channel (BCH) data, cell-radio network temporary identifier (C-RNTI), etc., cannot be large.

In this invention before the actual HO command is sent, a handover indicator message is transmitted from the source eNB to the UE containing relevant system information for the UE to connect to the target eNB. This makes the HO command smaller. This takes place simultaneously with transmitting the HO request message to the target eNB.

For radio bearers (RB) with time-sensitive packets, forwarding of unacknowledged downlink SDUs from the source to the target eNB should begin in conjunction with the HO command.

For RB with large but delay-tolerant packets, the UE should send a DL RLC status report to the source eNB before moving to the target eNB. For these RBs, the source eNB should forward to the target eNB only those downlink SDUs that have not been received by the UE at the RLC layer, starting as soon as the DL RLC status report reaches the source eNB.

Unacknowledged RLC packets should wait for RLC Status report for RBs with large delay-tolerant packets such as TCP. However, all un-sent DL data (data never transmitted on the downlink and not awaiting RLC ACKs) irrespective of radio bearer status should be forwarded to the target eNB as soon as the HO command is sent. This will stagger the load over the X2 interface and reduce latencies.

Figure 3:
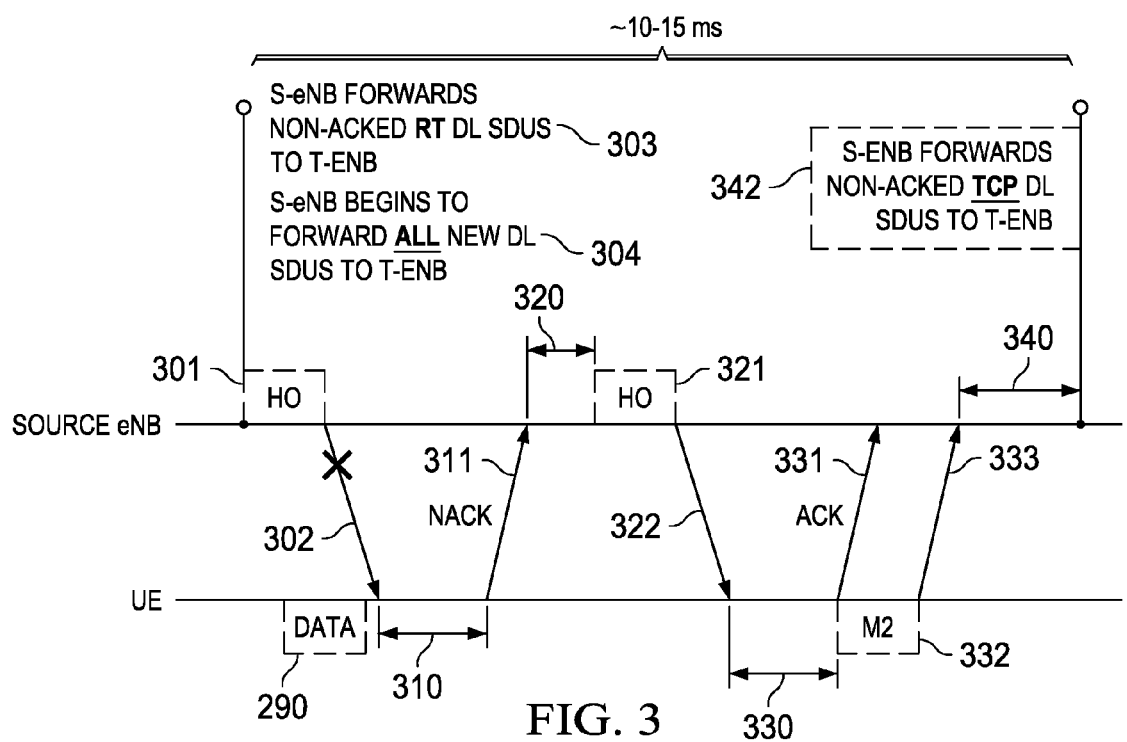
FIG. 3 illustrates the communications flow in an example of this invention.

FIG. 3 illustrates the communication process of this invention. Source eNB forwards non-ACKed downlink PDCP SDUs to target eNB (303) according to the radio bearer of the traffic. Forwarding for real time (RT) SDUs starts directly after the HO command is transmitted (304). Forwarding for larger TCP SDUs to the target eNB starts only after the source eNB receives the DL RLC Status report 333.

Figure 4:
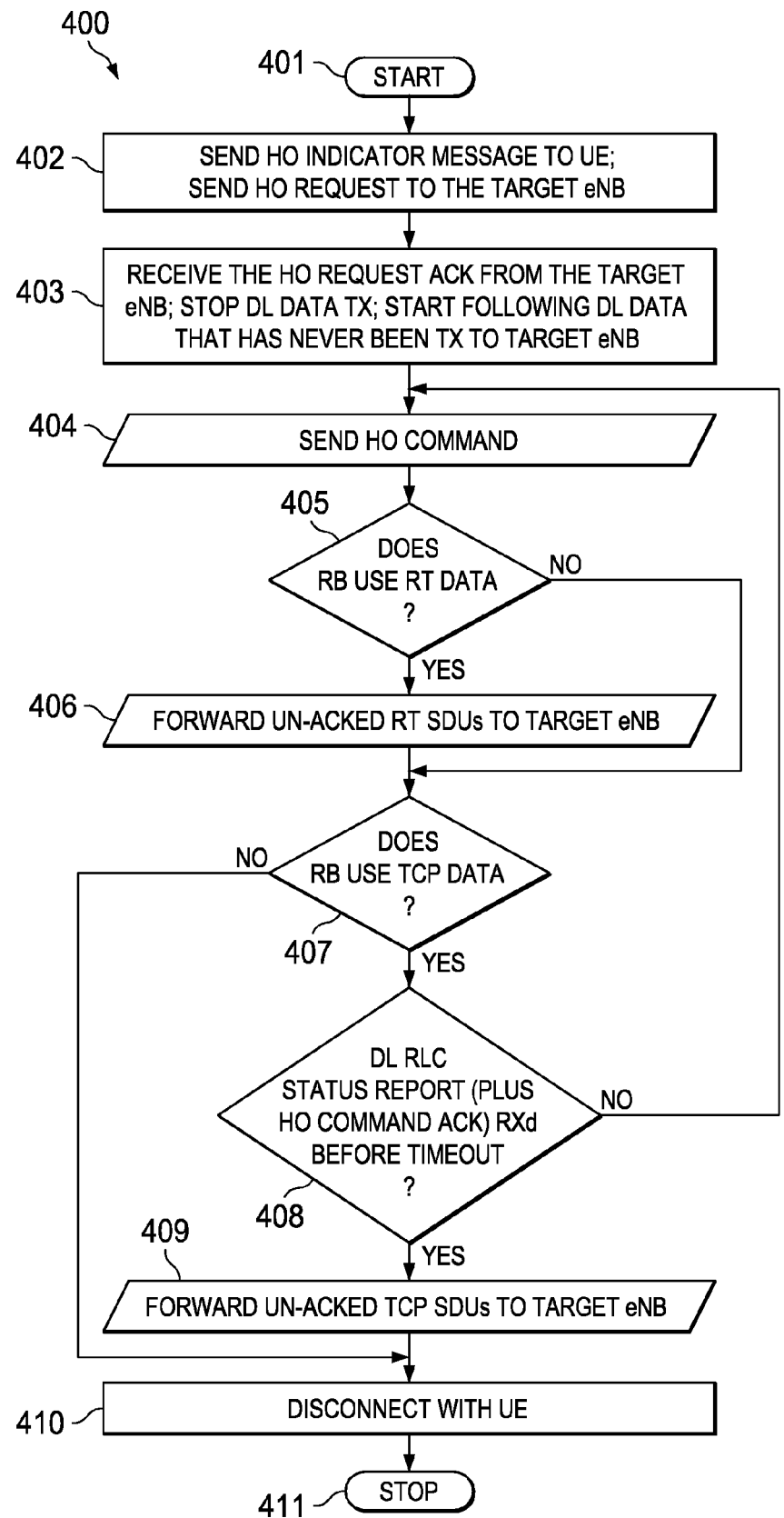
FIG. 4 illustrates the method of this invention in flow chart form.

FIG. 4 illustrates the method 400 of this invention of a radio bearer specific Handover mechanism. Start block 401 is when the Handover request message from the source eNB to the target eNB is initiated. Following the start block 401, method 400 sends the HO indicator message to the UE and the HO request to the target eNB (block 402).

In block 403 the source eNB receives the HO request ACK from the target eNB. In block 403 the source eNB stops DL data transmission. Finally, in block 403 the source eNB forwards not yet transmitted DL data to the target eNB.

In block 404 the source eNB transmits the HO command (322) to the UE.

In block 405 method 400 tests to determine if the UE is a RB requiring real time (RT) data. As previously described a voice call requires RT data. In addition a multi-user game with high interaction could require RT data. If so (Yes at block 405), then the source eNB forwards the non-acknowledged RT data SDUs to the target eNB in block 406. Method 400 then proceeds to block 407. If the RB does not use RT data (No at block 405), then method proceeds directly to block 407.

In block 407 method 400 tests to determine if the RB uses TCP data. A multi-user game with low interaction, such as a chess game, may fall into the class. A web page access would also fall into this class. If so (Yes at block 407), then method 400 tests to determine if the DL RCL status report plus the HO command ACK was received before a timeout interval (310 and 320). If a DL RCL status report has not been received by the timeout (No at block 408), then method 400 loops back to block 404 to retransmit the HO command 321. If a DL RCL status report has been received by the timeout (Yes at block 408), then block 409 forwards any unacknowledged SDUs to the target eNB (342).

If the RB does not use TCP data (No at block 407) or following block 409, block 410 disconnects the source eNB from the UE. Method 400 ends at stop block 411. Stop block 411 occurs when the UE has completed dissociating from the source eNB and moves to the target eNB.

The timing of the DL RLC Status report significantly affects the overhead on the X2 interface and less significantly affects the break latency. This invention is a radio bearer specific HO procedure. The source eNB transmits a Handover indicator message containing system information to the UE before transmitting the HO command. This permits the HO command message to be smaller in size. The source eNB sends the HO command with low MCS to improve reliability. This forwarding begins in conjunction with the HO command for Radio Bearers with time-sensitive packets. For radio bearers with possibly large but delay-tolerant packets, the UE sends a DL RLC status report. For these RBs, forwarding of downlink SDUs starts as soon as this DL RLC status report reaches the source eNB. All new DL data should be forwarded as soon as the HO command is sent.

What is claimed is:

1. A method of handoff of user equipment between a source node and a target node comprising the steps of:
   determining to handoff the user equipment from the source node to the target node;
   determining if the user equipment is employing real time data;
   if the user equipment is employing real time data
      forwarding from the source node to the target node all real time service data units not yet acknowledged by the user equipment,
      disconnecting the user equipment from the source node, and
      connecting the user equipment to the target node; and if the user equipment is not employing real time data
      continuing to receive acknowledgement from the user equipment at the source node for a predetermined time out period,
      following the time out period forwarding from the source node to the target node all service data units not yet acknowledged by the user equipment,
      disconnecting the user equipment from the source node, and
      connecting the user equipment to the target node.

2. The method of claim 1, wherein:
said steps of forwarding from the source node to the target node all real time service data units not yet acknowledged by the user equipment employs transmission via an X2 interface.

3. The method of claim 1, further comprising:
transmitting a handoff indicator message from the source node to the user equipment following determining to handoff the user equipment, the handoff indicator message containing relevant system information for the user equipment to connect to the target node.

4. The method of claim 3, further comprising:
simultaneously with transmitting the handoff indicator message, transmitting handoff request message from the source node to the target node.

5. The method of claim 4, further comprising:
upon receiving a handoff request acknowledgement at the source node from the target node
   ceasing downlink data transmission from the source node to the user equipment, and
   forwarding downlink data destined for the user equipment and not yet transmitted from the source node to the target node.

6. The method of claim 4, further comprising:
following determining to handoff the user equipment, transmitting a handoff command from the source node to the user equipment;
following determining if the user equipment is employing real time data, determining if the user equipment is employing transmission control protocol data;
if the user equipment is employing transmission control protocol data and a radio link control status report had been not received before the time out, re-transmitting handoff command from the source node to the target node; and
if the user equipment is not employing transmission control protocol data
   disconnecting the user equipment from the source node, and
   connecting the user equipment to the target node.

7. The method of claim 6, wherein:
said step of transmitting a handoff command employs a low modulation and coding scheme signal on a downlink synchronization channel.

* * * * *